V. A. PARKER.
TIRE MOLD.
APPLICATION FILED NOV. 4, 1919.

1,390,058.

Patented Sept. 6, 1921.

Inventor
V. A. Parker
By Robert M. Pierson
Atty.

UNITED STATES PATENT OFFICE.

VICTOR A. PARKER, OF AKRON, OHIO, ASSIGNOR TO THE B. F. GOODRICH COMPANY, OF NEW YORK, N. Y., A CORPORATION OF NEW YORK.

TIRE-MOLD.

1,390,058. Specification of Letters Patent. Patented Sept. 6, 1921.

Application filed November 4, 1919. Serial No. 335,710.

*To all whom it may concern:*

Be it known that I, VICTOR A. PARKER, a citizen of the United States, residing at Akron, in the county of Summit and State of Ohio, have invented a certain new and useful Tire-Mold, of which the following is a specification.

This invention relates to molds for rubber tires, and more particularly those having provision for exerting inward radial compression upon the tread portion of the tire, such type of mold being convenient or essential in the manufacture of relatively-broad and shallow cushion tires for heavy motor vehicles. My objects, generally speaking, are the attainment of an improved product from the mold, and greater convenience of assembling and disassembling the tire and the mold parts.

Of the accompanying drawings.

Figure 1:
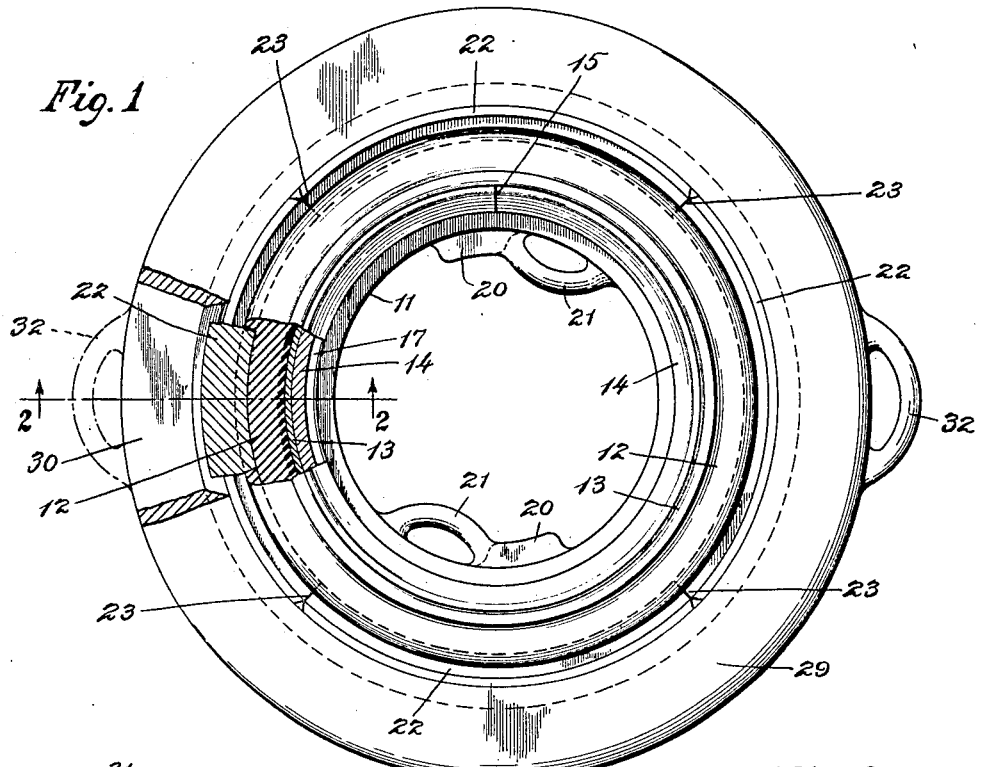
Figure 1 is a top plan view, partly in section, on the line 1—1 of Fig. 2, of a mold constructed according to my invention, showing a tire in place, and without the top member.

In the drawings, 10, 11 are the upper and lower main molding members or rings, 12 is the tire, 13 its annular base or rim and 14 is an expansible backing ring for said tire-rim, transversely split at 15, oppositely or double-wedge-formed on its back at 16, 16 and annularly grooved or undercut at 17 to provide shoulders for the reception of a prying tool to assist in loosening said ring from the mold and tire. The mold members 10, 11 are complementally wedge-formed at 18, 18 to expand this ring against the tire rim, and are formed to come together at 19 in back of said ring to take the final pressure of the tire press. 20, 20 are prying lugs on the mold members 10, 11 and 21, 21 are handles thereon for the reception of the lifting-hooks on a chain-hoist.

22, 22 are the segments of a tread-molding ring which is transversely divided at four points, 23, 23, is formed with ribs 24, 24 on its inner periphery for molding the usual circumferential grooves in the tire tread, and is wedge-formed with an upward taper at 25 on its back, extending for the full height of said ring, so as to make of the latter substantially an annular frustum of a cone with its base at the lower end. These ring segments are supported and radially slidable upon a horizontal annular seat 26 formed on the lower main mold member 11, and are adapted to be centralized with the latter and the upper member at the limit of their inward movement by a pair of annular flanges 27, 28 formed on said members. These flanges terminate at the two outer ribs 24, so that the circumferential overflow fins or rands on the tire-tread occur at the edges of the two outer grooves. The inner surfaces of said flanges and the adjacent portions of the mold-cavity surfaces on the members 10, 11 serve to mold the sides and adjacent tread portions of the tire, and the segmental ring 22, 22 molds the intermediate tread portion.

29 is a solid band ring adapted to fit between parallel horizontal flanges 30, 30 on the two main mold members when the latter are fully closed together and having an annular wedging surface 31 on its inner periphery complemental to the wedging surface 25 on the back of the tread-ring. 32, 32 are handles at opposite points on said band ring for the reception of chain-hoist hooks.

Figure 2:
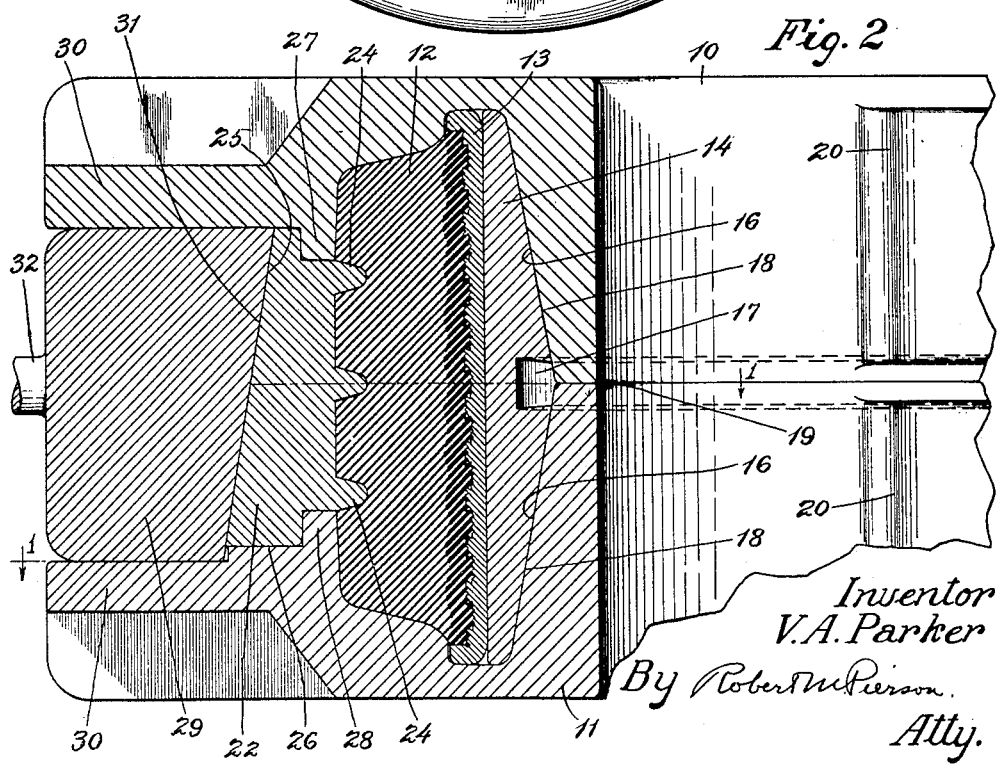
Fig. 2 is a section on a larger scale, on the line 2—2 of Fig. 1.

In operating my improved mold, the raw tire 12 with its rim and the backing ring 14 are located in the lower main mold member 11, and the tread-ring segments 22 are assembled on their seat 26. Then the band-ring 29 is lowered into place around said segments and partially telescoped therewith, after which the upper main mold member 10 is placed in position and the whole assembly is then located between the platens of the vulcanizing press and squeezed together by hydraulic pressure. This causes the main mold members 10, 11 to come together, forcing the backing-ring 14 fully into position, and the upper member, in its descent, pushes the band ring 29 down into the same plane as the tread-ring 22, 22, thereby contracting the segments of the later upon the tire, until the parts finally assume substantially the relation shown in Fig. 2. After the tire is vulcanized and the mold removed from the press, it is opened by lifting the entire mold by a chain-hoist with the handles 21 of the upper member 10. Then a prying tool is inserted between the lugs 20 and the lower parts are forced away from said upper member onto the floor. The tire and all auxiliary mold parts remain in the lower main member 11. The backing ring 14 is then pried out of said lower member to loosen the tire, the band ring 29 is lifted off, and the segments 22 of the tread-molding ring are pulled away from the tire, after which said tire may be readily lifted out of the bottom mold member.

By making the wedging band-ring 29 as a member separate from both main molding members the opening of the mold is facilitated by reduction of the amount of frictional surface which has to be initially disengaged, and by so arranging that the tread-ring segments may be assembled on a seat on the lower main member and then radially slid into place against the tire instead of requiring said segments to be first assembled with the tire while the latter is out of the mold I greatly facilitate the operation of the mold and the accuracy of initial registration of molding parts with the tire, besides making it convenient to provide as many as four segments in said tread ring with consequently smaller and better-distributed transverse overflow fins and no bolting and unbolting of segments to perform as compared with the common use of a bolted 2-segment tread ring for tires of this character.

Various changes in the details of construction herein described may be made without departing from the scope of my claims.

I claim:

1. A rubber-tire mold comprising two main molding rings and an interposed segmental tread-molding ring, inclosing between them an annular molding cavity, one of said main rings having a seat substantially parallel with the general plane of the mold on which the segments of the tread-molding ring are radially slidable to open and close said ring, and means whereby the bringing together of said main mold rings contracts said tread-molding ring upon the tire.

2. A rubber-tire mold comprising a lower main molding ring having a horizontal tread-ring seat, an upper main molding ring, and a segmental tread ring formed substantially as an annular frustum of a cone with its base slidably supported on said seat, said mold having wedging means actuated by the descent of the upper main ring and coacting with the backs of the tread-ring segments for collectively contracting said segments upon the tire.

3. A rubber-tire mold comprising upper and lower main rings, each formed with part of an annular cavity for molding the sides and adjacent tread portions of a relatively broad and shallow tire, a tread-ring seat on the lower main ring, an interposed segmental tread-ring for molding the intermediate tread portion, the segments whereof are radially slidable on said seat and wedge-formed on their backs with an upward taper extending substantially throughout the height of said segments, and complemental wedging means actuated by the descent of the upper main ring for forcing the tread-ring segments inwardly against the tire.

4. A rubber-tire mold comprising upper and lower main molding rings, said lower ring having a seat in a radial plane, a segmental tread-molding ring wedge-formed on its back and radially slidable on said seat, said rings inclosing between them an annular molding cavity, and a complementally wedge-formed band ring separate from the two main rings and adapted to be forced against said tread-molding ring to contract the latter upon the tire by the closing-together of said main rings.

5. A rubber-tire mold comprising upper and lower main molding rings and a segmental tread-ring inclosing an annular molding cavity between them, the segments of said tread-ring being radially slidable on a seat on the lower main ring and having wedge-formed backs slanting in one direction from top to bottom of the segments, and a complementally wedge-formed band ring separate from the two main rings, adapted to embrace said tread ring and to be forced into the plane thereof to contract the segments upon the tire by the closing-together of the two main rings.

6. A rubber-tire mold comprising upper and lower main molding rings each formed with annular surfaces for molding the sides and adjacent tread portions of a relatively broad and shallow tire, the said tread-molding surfaces being on flanges whose outer sides constitute centering means for the tread ring, the lower ring having a horizontal tread-ring seat surrounding its flange, a segmental ring slidingly supported on said seat for molding the intermediate tread portion of the tire, and wedging means operated by the descent of the upper main ring for contracting said tread ring upon the tire.

7. A rubber-tire mold comprising upper and lower main molding rings having annular tread-ring centering members, a tread-ring seat surrounding said member on the lower main ring, a segmental tread-molding ring slidingly supported on said seat and wedge-formed on its back, and a complementally wedge-formed band ring adapted to be actuated by the descent of the upper main ring and structurally separate therefrom for contracting said tread-molding ring upon the tire.

8. A rubber-tire mold comprising upper and lower wedge-formed molding rings, a complementally double-wedge-formed expansible tire-backing ring, a segmental tread-molding ring, and a tread-ring-wedging band ring actuated by the upper main ring.

In witness whereof I have hereunto set my hand this 27 day of October, 1919.

VICTOR A. PARKER.